J. C. REGAN.
SUPPORT FOR INSULATING BASES.
APPLICATION FILED MAR. 19, 1919.
1,410,035. Patented Mar. 21, 1922.
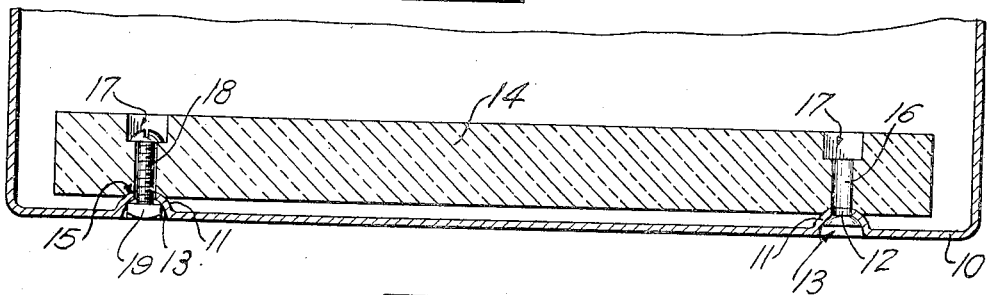
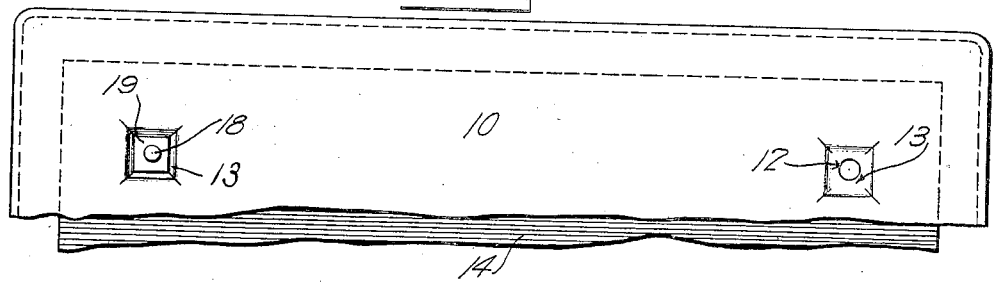
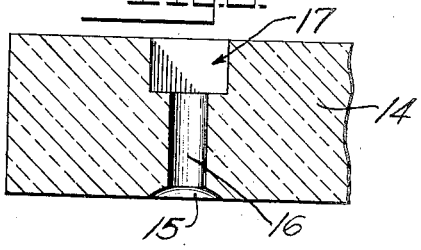
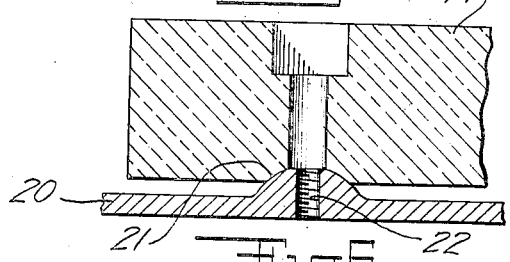
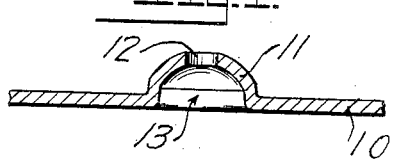
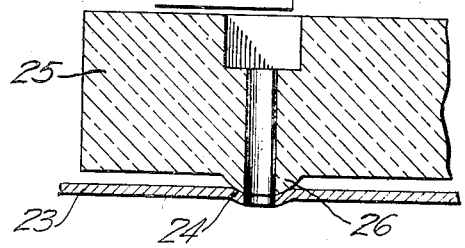
INVENTOR
JOSEPH C. REGAN
BY
ATTORNEY

UNITED STATES PATENT OFFICE.

JOSEPH C. REGAN, OF NEW BRITAIN, CONNECTICUT, ASSIGNOR TO THE TRUMBULL ELECTRIC MANUFACTURING CO., OF PLAINVILLE, CONNECTICUT, A CORPORATION OF CONNECTICUT.

SUPPORT FOR INSULATING BASES.

1,410,035.

Specification of Letters Patent. Patented Mar. 21, 1922.

Application filed March 19, 1919. Serial No. 283,509.

*To all whom it may concern:*

Be it known that I, JOSEPH C. REGAN, a citizen of the United States of America, residing at New Britain, Connecticut, have invented a new and useful Support for Insulating Bases, of which the following is a specification.

In constructions commonly known as enclosed switches, panel boards and the like, it is customary to mount the switches, fuses, etc., on an insulating base and to secure this base in a metal box. It has been found that in handling these structures, especially in shipment, that the insulating base frequently works loose and sometimes in fact is broken away from the support. Not only does this injure the parts themselves, but the displacement of the base relative to the support is likely to disturb the electrical and mechanical connections and render the structure either dangerous or unfit for use. It is particularly important to retain the base in its proper position relative to the support in structures known as safety switches, especially where there are interlocking relations between the parts carried by the base and the cover of the box. One type of such safety switch is illustrated in the Sutherland Patent #1,271,520.

The main object of my invention is to provide a simple and inexpensive construction which will properly space the insulating base from the principal part of the support and hold the parts securely in their proper relative position.

In its preferred form, the invention accomplishes these results by providing the metal support with a plurality of raised spherical seats fitting into correspondingly recessed portions of the insulating base, and securing the two members together by means of bolts. Preferably, the support is recessed in line with the seats to afford housings for the nuts of the bolts.

Fig. 1 is a sectional view showing a portion of a steel box and an insulating base with the connections made according to the preferred form of my invention. The connecting bolt is shown at the left but omitted at the right.

Fig. 2 is a bottom plan view of the same.

Fig. 3 is an enlarged fragmentary sectional view showing the construction of the insulating base adjacent a connecting point.

Fig. 4 is a similar view of the support.

Fig. 5 is a fragmentary sectional view showing a modified form of support in its assembled relation relative to the insulating base.

Fig. 6 is a similar view showing a modified form of support and base.

The supporting box 10 is usually of steel. In the preferred form, a plurality of spherical bosses or seats 11 is formed projecting into the box. Each boss has a central aperture 12. In its preferred form there is a square recess 13 adjacent each boss to provide a housing space.

The insulating base 14 is usually of slate and provided with a spherical seat 15 to fit the boss 11. A passage 16 is provided coaxial with the spherical seat 15 and an enlarged space or recess 17 at the opposite face of the base.

The parts are held together by a bolt 18 which goes through the passage 16 and the aperture 12, and is provided with a nut 19 which is housed in the recess 13. The bosses 11 and recesses 15 are so designed and proportioned as to hold the insulating base spaced apart from the metal support the proper distance. This form of connection securely holds the parts in their proper relative positions so as to prevent shifting of the base. This also affords housings for the nuts in the back of the support so that the back of the box has no projections. This also automatically holds the nuts from turning when inserting or removing the screws.

In the form shown in Fig. 5, the support 20 is indicated as of cast iron and provided with a boss 21 integral therewith. In this case, the boss and support are screw threaded at 22 to receive a securing screw. This does away with a separate nut.

In the form shown in Fig. 6 the support 23 is provided with a depressed spherical seat 24 and the base 25 is provided with a spherical boss 26 which engages the seat 24 so as to relatively space and position the parts. In each form of device there are interfitting spherical bosses and seats connected by screw bolts so that the insulating base is spaced apart from the metal box support and at the same time held securely against displacement.

I claim:

1. In a construction of the character described, the combination of a sheet metal support, an insulating base of frangible material provided with interfitting, substantially spherically shaped bosses and seats, and means passing through said bosses and seats for connecting said members together adjacent said bosses and seats but leaving them spaced apart throughout their principal areas.

2. In a construction of the character described, a sheet metal support provided with projecting bosses with substantially spherically shaped bearing surfaces, an insulating base of frangible material provided with recesses fitting over and engaging the surfaces of said bosses, and means connecting said support and said base adjacent said bosses and recesses.

3. In a construction of the character described, the combination of a sheet metal support having projecting bosses with substantially spherically shaped faces, an insulating base of frangible material with recesses engaging and fitting said bosses, and screw-like members passing through said base and said support for securing the parts together at said bosses and recesses.

4. In a construction of the character described, a sheet metal support, an insulating base of frangible material, interfitting, substantially spherically shaped bosses and recesses carried by said members for holding them in a spaced relation, and bolts connecting said base and said support at said interfitting bosses and recesses.

5. In a construction of the character described, a sheet metal support having nut-receiving recesses in one face and substantially spherically-shaped bosses projecting from the opposite face thereof, an insulating base of frangible material having recesses fitting over and engaging the faces of said bosses, nuts held in said nut-receiving recesses, and screws passing through the base and bosses into engagement with said nuts for holding the base in position spaced away from the main area of the support.

6. In a construction of the character described, the combination of a sheet metal box having a plurality of inwardly formed, substantially spherically faced, supporting and positioning bosses, an insulating base having correspondingly located recesses in which the outer ends of said bosses fit, and fastening members passing through said members at said bosses and recesses for holding said members together, said bosses and recesses and said fastening members serving to prevent relative lateral shifting of said insulating base in said box.

JOSEPH C. REGAN.